Nov. 29, 1966 C. C. SILVERSTEIN 3,287,910
NUCLEAR REACTOR
Filed Sept. 4, 1963 3 Sheets-Sheet 3
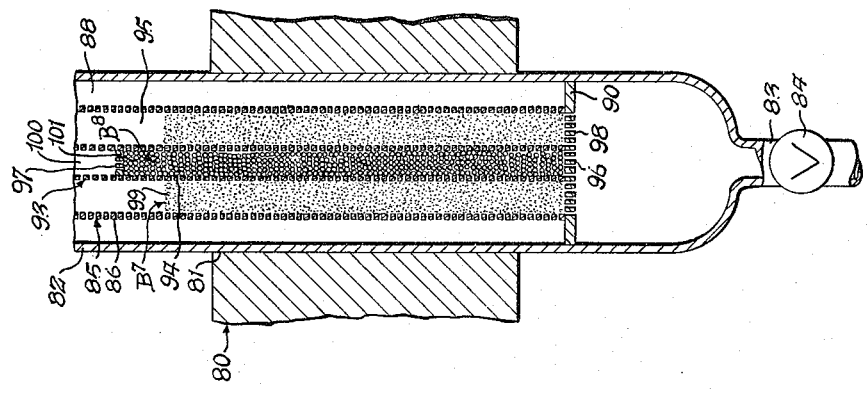
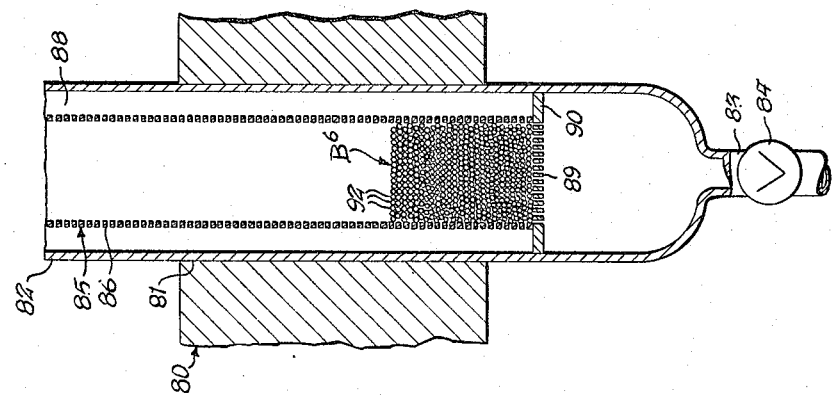
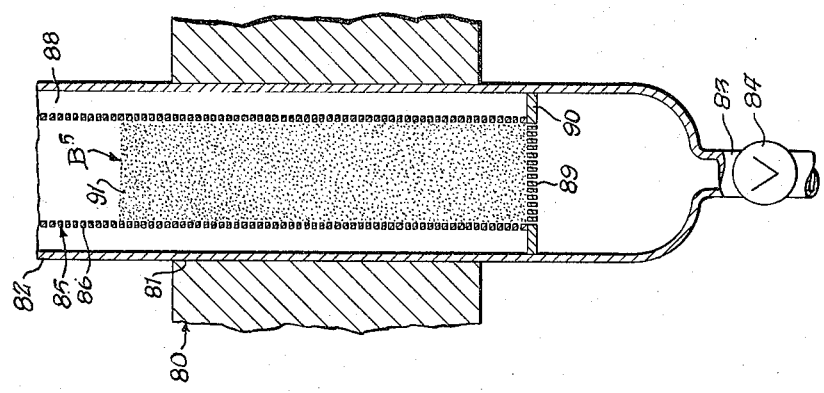
INVENTOR.
CALVIN C. SILVERSTEIN
BY
*Popp and Sommer*
ATTORNEYS

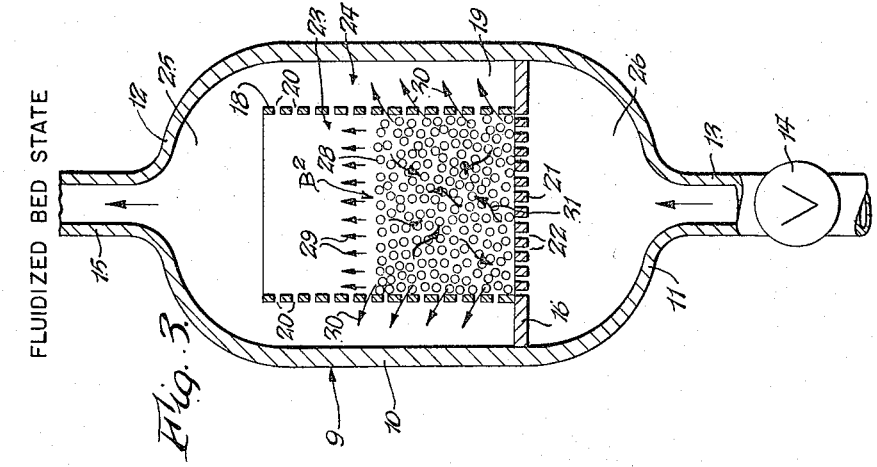
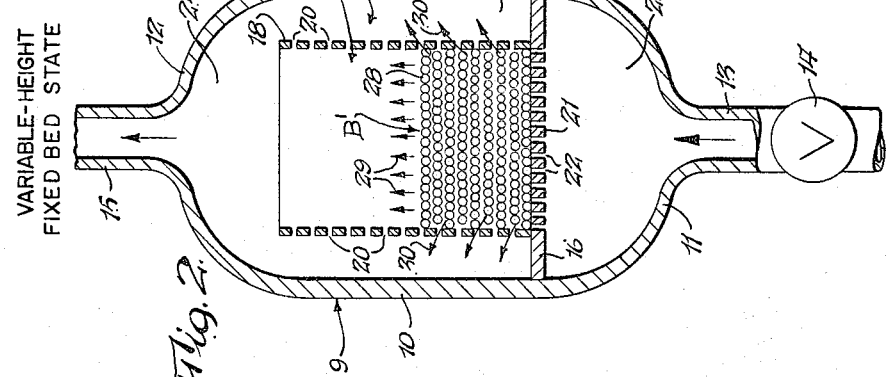
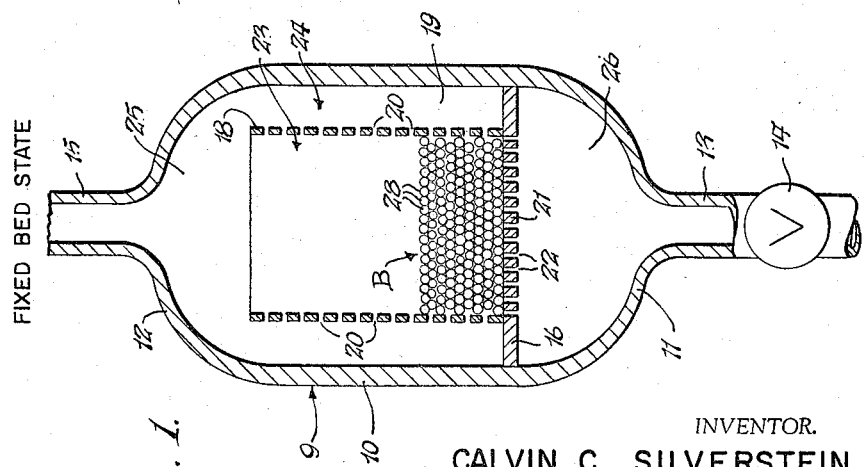

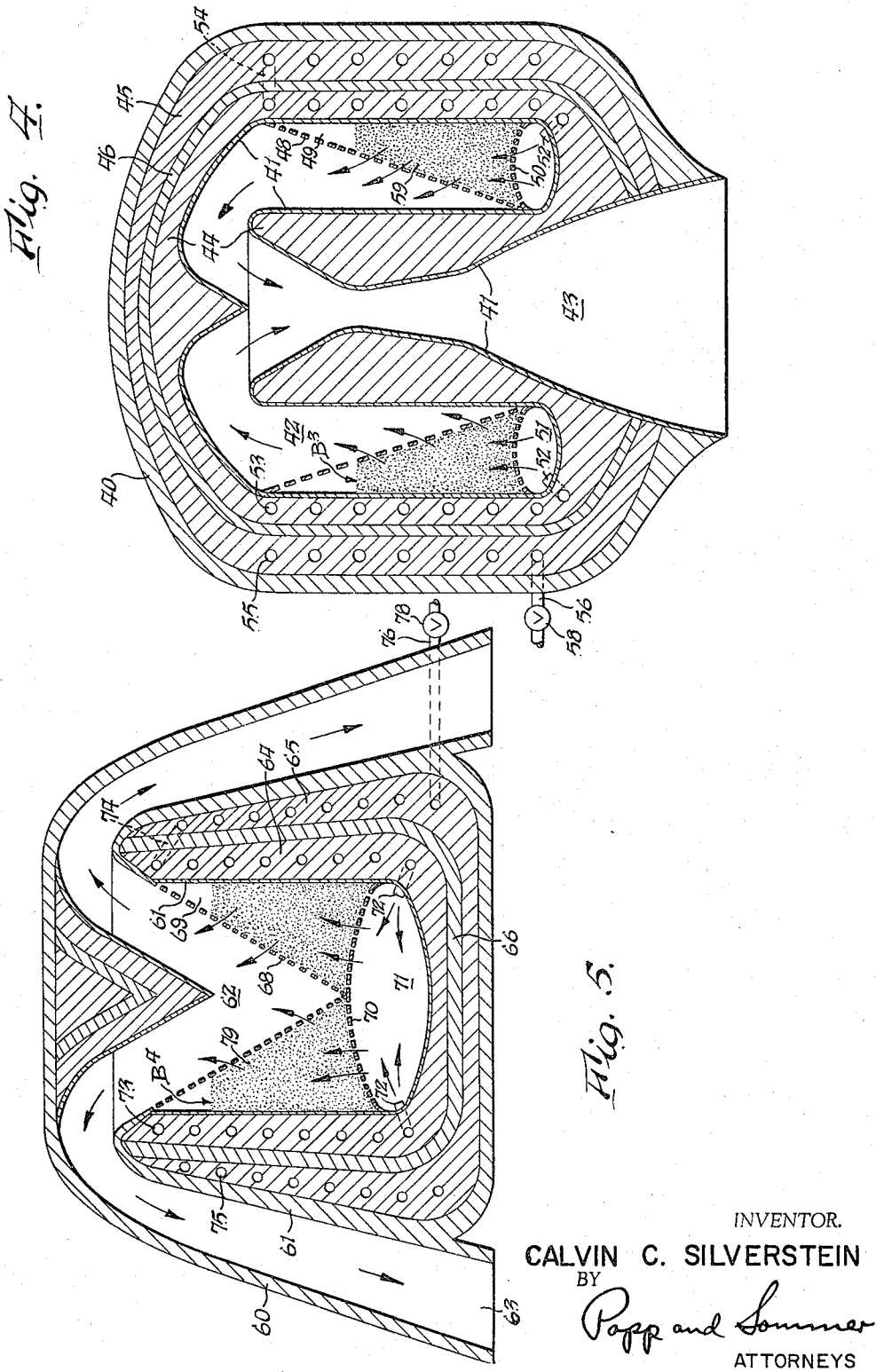

United States Patent Office 3,287,910
Patented Nov. 29, 1966

3,287,910
NUCLEAR REACTOR
Calvin C. Silverstein, Trenton, N.J., assignor to Cornell Aeronautical Laboratory, Inc., Buffalo, N.Y., a corporation of New York
Filed Sept. 4, 1963, Ser. No. 306,423
27 Claims. (Cl. 60—203)

This invention relates to improvements in nuclear reactors.

It is known to provide a nuclear reactor including a core container having an imperforate side wall and a perforated bottom wall adapted to support a bed of freely movable discrete solid fissile particles. Such bed is converted from a fixed or unfluidized state to a fluidized state when the flow rate of fluid introduced through the perforations in the bottom wall and flowing upwardly through the bed is sufficiently great to tend to expand the bed into a larger fixed volume in which the particles will circulate continuously. The transition from the fixed to the fluidized state occurs with little or no bed expansion. When the bed in a fluidized state has been expanded to a predetermined height in which the fissile particles have been suspended in a critical geometric disposition, a self-sustaining nuclear chain reaction occurs which produces fission-generated heat that is absorbed by the fluid. Such a known bed type nuclear reactor is disclosed in British Patent No. 756,014 dated August 29, 1956, for example, and will hereinafter sometimes be referred to as a solid wall fluidized bed reactor.

An object of the present invention is to provide a novel construction of particle container for a nuclear reactor.

Another object is to provide a novel construction of nuclear reactor in which a fixed bed of particles in a container can be expanded in height by flowing a fluid through the bed so as to provide a transitional state between the fixed and fluidized states during which transitional state the bed particles remain substantially fixed in relative position while the bed height is variable substantially, thus providing a variable-height-fixed-bed, and thereby avoiding an immediate transition of the bed from a fixed to a fluidized state and permitting the reactor to be operated without the bed density and height fluctuations characteristic of the fluidized state.

Another object is to provide a novel construction of nuclear reactor having a variable-height-fixed-bed of fissile particles which has been expanded in volume over that when the bed of particles is in a fixed state but below that when the bed is in a fluidized state and sufficiently to produce a self-sustaining nuclear reaction, so as to operate at higher power densities than a solid wall fluidized bed reactor.

Another object is to provide a novel construction of nuclear reactor having a bed of fissile particles in a container which requires a greater flow rate of fluid for a given bed expansion than obtains with a solid wall fluidized bed reactor, whereby the increased flow rate permits a greater heat-generation rate in the expanded bed for a specified temperature rise of the fluid than is possible in a fluidized bed reactor having a solid wall container of the same diameter.

A more specific object is to apply the novel nuclear reactor of the present invention to a rocket engine so constructed that, as compared to presently know nuclear rocket engine designs employing fixed solid fuel elements, it is superior in the respects of simplicity, compactness and regulation and has a lower pressure drop and a higher specific impulse.

Another specific object is to apply the principles of the present invention to controlling the reactivity of a solid fuel type nuclear reactor.

Other objects and advantages of the present invention will be apparent from the following detailed description of embodiments thereof illustrated in the accompanying drawings wherein:

FIG. 1 is a vertical central sectional view of one form of bed type nuclear reactor constructed according to the principles of the present invention and showing a bed of fissile particles in a fixed bed state.

FIG. 2 is a view similar to FIG. 1 but showing the bed of particles in a variable-height fixed bed state.

FIG. 3 is a view similar to FIGS. 1 and 2 but showing the bed of particles in a fluidized bed state.

FIG. 4 is a vertical central sectional view of another form of nuclear reactor and showing the same embodied in a rocket engine.

FIG. 5 is a vertical central sectional view of another nuclear rocket engine embodying still another form of the present invention.

FIG. 6 is a vertical central sectional view through a solid fuel type nuclear reactor equipped with one form of reactivity control means constructed according to the principles of the present invention.

FIG. 7 is a view similar to FIG. 6 but showing another form of reactivity control means.

FIG. 8 is a view similar to FIG. 6 but showing still another form of reactivity control means.

The basic concept of the present invention is to flow fluid through a bed of particles in a container arranged in a nuclear reactor so that part of the fluid passes through the upper surface or top of the bed and the remainder of the fluid passes laterally through the side of the bed. This is achieved by constructing the particle container with a perforated or porous side wall.

Referring to FIGS. 1–3, the numeral 9 represents generally a hollow vessel shown as comprising an imperforate cylindrical wall 10 disposed with its central longitudinal axis vertically, and having outwardly convexed lower and upper end heads 11 and 12, respectively. A fluid inlet duct 13 having an adjustable valve 14 of any suitable construction operatively arranged therein, is shown as extending vertically downwardly from the center of the lower end head 11 and communicating with the interior of the vessel. A fluid outlet duct 15 is shown as extending vertically upwardly from the center of the upper end head 12 and communicating with the interior of the vessel.

A horizontal wall 16 is shown as extending transversely of the cylindrical wall 10 adjacent its lower end, and is suitably connected thereto. A cylindrical inner wall 18 is arranged within the vessel concentrically with the outer wall 10 and spaced therefrom to provide an annular space 19 therebetween. This upstanding inner wall 18 rests upon the upper surface of the horizontal wall 16 and is suitably connected thereto.

In accordance with the inventive concept, the inner wall 18 is porous, being rendered so by a multiplicity of horizontal holes or perforations 20 provided in this wall. These perforations 20 are shown as uniformally spaced for the full height of the inner wall 18 and circumferentially therearound so as to extend over the entire area of this wall. The size or spacing of the perforations 20 may be nonuniform if desired.

The central portion of the horizontal wall 16 circumscribed by the upstanding inner wall 18 is indicated at 21 and is also porous, being rendered so by a multiplicity of vertical holes or perforations 22 provided in this portion.

Thus the inner wall 18 and horizontal wall portion 21 at its lower end jointly provide an inner container represented generally by the numeral 23 having a perforated side wall and a perforated bottom wall. The space 19 surrounding the inner container 23 and defined by the perforated inner side wall 18 and the imperforate outer side wall 10, and closed off at its lower end by the imperforate marginal portion of the horizontal wall 16 surrounding the perforated central portion 21, provides an outer container represented generally by the numeral 24.

The interiors of the containers 23 and 24 through their open upper ends are in constant fluid conducting communication with the upper region 25 of the vessel and in turn with the fluid outlet duct 15. The region of the vessel below the horizontal wall 16 provides a chamber 26 which is in constant communication with the overhead perforations 22 and the underneath fluid inlet duct 13.

Arranged within the inner container 23 is a multiplicity or profusion of freely movable discrete solid particles 28. These particles rest upon and are supported by the upper surface of bottom wall 21 to form a bed B in a fixed state, as illustrated in FIG. 1. The perforations 20 and 22 are smaller in size than any particle 28 so that the particles may be confined to the interior of the inner container 23.

When a fluid such as water is forced upwardly through the perforated bottom wall 21 into the bed B of particles 21, only a fraction of the fluid will pass through the upper surface or top of the bed as depicted by the arrows 29 in FIG. 2, the remainder flowing outwardly through the perforations in the side wall 18 from the bed into the space 19 as depicted by the arrows 30 in FIG. 2. For a determinable range of bed entrant velocities, the bed will expand, occupying a larger volume effected by an increase in bed height, while the particles remain essentially immobile although freely movable. The bed is referred to as a variable-height fixed bed while in this state just described and is illustrated at $B^1$ in FIG. 2. For bed entrant velocities of fluid beyond the upper limit defining the variable-height fixed bed state, the bed will enter the fluidized state illustrated at $B^2$ in FIG. 3 in which the particles 28 continuously circulate as indicated by the arrows 31. For velocities below the lower limit, the bed is in the fixed state B depicted in FIG. 1.

If the particles 28 contain fissionable material and when the variable-height fixed bed of fissile particles is expanded to a certain determinable height, the bed configuration will be such that a self-sustaining nuclear chain reaction occurs. At this critical height the bed can produce fission-generated heat at a constant rate. Such heat is transferred to or absorbed by the fluid flowing through the bed and this heated fluid is removed through the outlet duct 15. The rate of fluid flowed through the bed determines the height of the bed and is controlled by adjustment of the valve 14.

The transition from a fixed bed state to a fluidized bed state is not immediate with the practice of the present invention. Instead of being immediate, as is the case with a solid wall fluidized bed reactor, the transition is marked by expansion of the fixed bed by as much as 30 percent before the fluidized state develops. The velocity of the upwardly flowing fluid can increase by more than 50 percent as the bed changes from the fixed to the fluidized state. In this transitional state the relative position of the bed particles remains substantially fixed while the bed height is variable.

Thus a variable-height fixed bed nuclear reactor can operate without the fluctuations in density and height which are characteristic of the bed when in a fluidized state. Also, a variable-height fixed bed nuclear reactor can operate at higher power densities than a solid wall fluidized bed reactor.

Further, regardless of whether a nuclear reactor having a perforated wall container of the present invention is operated with the bed in a variable-height fixed state or a fluidized state, it will be seen that use of a porous rather than a solid wall to enclose the bed particles requires a greater flow rate of the fluid for a given bed expansion. This increased flow rate permits a greater heat-generation rate in a given bed expansion for a given temperature rise of the fluid flowing through the bed.

While water was mentioned hereinabove as the fluid used to control the expansion of a bed of particles, any other suitable fluid, liquid or gas, may be employed for this purpose. The fluid not only performs the function of expanding the particle bed, but acts as a coolant absorbing heat and preferably as well acts as a moderator upon neutron activity, all as is well understood by those skilled in the art. Such skilled persons also know how to select for a particular reactor design the size, number and composition of the fuel-bearing particles 28.

In FIGS. 1–3, the nuclear reactor there depicted is employed to heat a fluid such as water which can then be used to operate other power equipment (not shown).

In FIGS. 4 and 5, the nuclear reactor is depicted as embodied in two specifically different although significantly similar designs of rocket engines. Present nuclear rocket engine development employs a nuclear reactor with fixed solid fuel elements over which flows a gaseous rocket propellant such as hydrogen. Heat produced in the fuel elements by the fission process is transferred to the propellant, heating it to the desired temperature.

A nuclear rocket engine constructed according to the present invention employs a different principle to effect the transfer of heat from fuel elements to the propellant. It differs in the respects that the nuclear fuel and moderator are confined to separate, distinct regions; the fuel elements comprise small particles which are in a fluidized state during normal operation; and a porous wall confines the fuel particles in a lateral direction.

Referring to FIG. 4, the nuclear rocket engine there shown comprises an inverted, generally cup-shaped outer casing 40, an inner casing 41 formed to provide an annular recess 42 surrounding and communicating with a nozzle section 43. The space between the casings 40 and 41 is occupied by an inner moderator body 44 separated from an outer moderator body 45 by an insulating layer 46. The inner moderator body 44 may be composed of graphite, and the outer moderator body 45 of zirconium deuteride. Slanting upwardly and outwardly across the annular recess 42 is a frusto-conical, perforated side wall 48 defining on its outside an annular space 49 enclosed at its lower end by a perforated bottom wall 50. This perforated bottom wall 50 is shown as an upwardly arched annular plate extending transversely of the annular recess 42 above the floor of such recess to provide therebetween an annular chamber 51.

This chamber 51 serves as a manifold for a propellant fluid such as hydrogen which is introduced into this manifold by one or more nipples 52 which extend from the downstream and lower end of an inner coil 53 connected as shown at 54 to the upper end of an outer coil 55. This outer coil has an inlet conduit indicated diagrammatically at 56 and connected to any suitable source of propellant fluid (not shown). A control valve 58 is shown arranged in the inlet conduit 56.

The inner coil 53 has a plurality of convolutions which are shown as embedded in the inner moderator body 44 and the outer coil 55 also has a plurality of convolutions but these are shown as embedded in the outer moderator body 45.

Confined within the annular space 49 is a multiplicity of freely movable discrete solid fissile particles 59 which form a bed $B^3$ adapted to be supported on the bottom wall 50. The particles 59 are small, being of no greater than 0.1 inch diameter, and may be composed of enriched uranium carbide in a matrix of tungsten or tungsten carbide. The 184 isotope of tungsten is preferred because of its relatively low thermal neutron absorption cross section.

Liquid hydrogen introduced through conduit 56 and controlled by valve 58 flows successively through coils 55 and 53. It acts as a coolant absorbing heat from the moderator bodies 44 and 45 and prevents these bodies from overheating. In the process the liquid hydrogen is boiled so that it enters manifold 51 in a gaseous state. The gaseous hydrogen flows upwardly through the perforations in the button wall 50 and causes the fuel particles 59 to expand into a bed of larger volume at which a chain reaction is self-sustaining. The particles 59 then generate heat and transfer the heat to the hydrogen propellant. This heated hydrogen propellant leaves the bed of particles both through the top of the bed $B^3$ and through the perforations in the side wall 48.

After the heated hydrogen propellant leaves the reactor core space 49 it passes into the nozzle section 43 where it is expanded to the desired velocity and ejected from the engine.

Referring to FIG. 5, the modified nuclear rocket engine there shown comprises an inverted generally cup-shaped outer casing 60 and a hollow inner casing 61 spaced therefrom to provide a central recess 62 communicating with an annular nozzle 63. The spaced walls of the inner casing are filled with an inner moderator body 64 separated from an outer moderator body 65 by an insulating layer 66. Arranged within the recess 62 is an inverted conical perforated side wall 68 defining on its outside an annular space 69 enclosed at its lower end by a perforated bottom wall 70. This wall 70 arches upwardly above the floor of the recess 62 to provide therebetween a chamber 71. Nipples 72 are shown as communicating with the chamber 71 and with the lower end of an inner coil 73 embedded in inner moderator body 64 and connected at 74 to an outer coil 75. An inlet conduit 76 having a control valve 78 therein supplies the outer coil 75 with propellant fluid. Confined within the annular space 69 is a bed $B^4$ of nuclear fuel partciles 79.

The nuclear rocket engine shown in FIG. 5 operates in the same manner described for the one shown in FIG. 4. If desired, the nuclear rocket engines shown in FIGS. 4 and 5 may be operated so that the bed of fissile particles is maintained in a variable-height fixed bed state, as hereinabove defined, instead of the fluidized bed state specifically described.

In FIGS. 6–8, the concept is depicted as embodied in different forms of reactivity control means for a nuclear reactor of the type having a solid fuel core comprising solid elements containing fissionable material arranged in a fixed predetermined spatial pattern, as is well understood by those skilled in the art. Heretofore such a solid fuel type reactor was controlled by moving solid control elements in and out of openings provided in the reactor core.

Referring to FIG. 6, the numeral 80 represents a solid type reactor core of any suitable construction and having an opening 81 extending vertically therethrough. Arranged vertically in this opening 81 is a vessel having an imperforate tubular wall 82 including an inlet portion 83 at its lower end. An adjustable fluid flow control valve 84 is shown arranged in the inlet portion 83. Arranged within the tubular wall 82 is an upright container 85 having a perforated cylindrical tubular side wall 86 arranged concentrically with the surrounding cylindrical portion of the outer wall 82 to provide an annular space 88 therebetween. The container 85 also has a perforated circular flat horizontal bottom wall 89. The bottom of the annular space 88 is closed by a horizontal end wall 90 which is shown as being an annular marginal extension of the plate forming the flat bottom wall 89. This plate 89, 90 is shown arranged below the lower end of the opening 81 in the reactor core 80. Arranged within and confined by the container 85 is a bed $B^5$ of particles 91 composed of a suitable neutron-absorbing material of moderate absorption properties so that the absorption rate is significant along the entire radius of the bed. An example of such a material is a strong neutron absorber such as boron mixed with a weak neutron absorber such as graphite.

When the bed $B^5$ is in a fixed state as depicted in FIG. 6, the bed extends completely through the reactor core 80.

The bed $B^5$ can be expanded by controllably flowing a liquid upwardly through the perforations in the bottom wall 89, part of this liquid escaping outwardly through the perforations in the side wall 86. Expansion of the bed by an upward-flowing fluid will remove a fraction of the bed particles 91 from the reactor core, thus reducing the total neutron absorption rate and increasing reactivity. The maximum neutron absorption rate, and hence the maximum negative reactivity of the bed $B^5$, will occur when the velocity of the upward-flowing fluid is zero and the bed is at rest or in a fixed state.

The apparatus shown in FIG. 7 is identical to that shown in FIG. 6 and hence the same reference numerals are used to indicate like parts. However, in FIG. 7 the particles 92 are composed of a fissionable material to form a bed represented at $B^6$. The initial height of the bed $B^6$ of fissile particles is a relatively small fraction such as about one-third of the reactor core height, as depicted in FIG. 7. When the bed $B^6$ is fluidized by an upward-flowing fluid, it will occupy a larger fraction of the core volume. The fission rate in the expanded bed will increase because the reduced bed density will result in a greater rate of fission in the bed region closer to the center of the bed, while the fission rate near the bed periphery will be relatively unaffected. Hence, expansion of the bed will cause reactivity to increase and contraction will cause reactivity to decrease. If the bed is expanded to the point where a fraction of the bed lies outside the core above the upper end of the core opening 81, such removal of fissile material will cause reactivity to decrease. Hence, in the form of reactivity control means shown in FIG. 7, the increase of reactivity resulting from expansion of the bed $B^6$ is limited to a definite value.

In FIG. 8, the apparatus is shown modified to the extent of providing an inner container 93 within the container 85. Thus the inner container 93 comprises a perforated cylindrical tubular side wall 94 arranged concentrically within and spaced from the outer perforated side wall 86 to provide therebetween an annular space 95. The central circular portion of the perforated bottom plate circumscribed by the inner perforated side wall 94 is indicated at 96, leaving an intermediate annular perforated portion 98. The inner container 93 is shown as also including a perforated top wall 97 arranged above the upper end of the reactor core. Otherwise the apparatus is substantially the same as shown in FIGS. 6 and 7 and the same reference numerals have been applied to indicate like parts.

Arranged within the annular space 95 in outer container 85 is a bed $B^7$ of suitable neutron-absorbing particles 99 such that the absorption rate is significant along the entire bed radius. Arranged within the interior 100 of the inner container 93 is a fixed bed $B^8$ of fissible particles 101. The height of both beds is at all times greater than that of the opening 81 in the reactor core 80.

When the outer bed $B^7$ is expanded by fluid flowing upwardly through the perforations in bottom wall 98, some of this fluid enters the fixed inner bed $B^8$ through the perforations in inner perforated wall 94, and some of the fluid flows laterally outwardly through the perforations in outer perforated wall 86. When the outer bed $B^7$ of neutron-absorbing material expands, reactivity increases because such absorbing material is removed from the core, reducing the neutron absorption rate, and also because shielding of the central fixed bed $B^8$ of fissile material by the surrounding fluidized neutron-absorbing bed $B^7$ is reduced, increasing the fission rate in the bed $B^8$.

It will be understood that the various spaces shown in FIGS. 6–8 within the tubular vessel 82 above the transverse plate 90 therein communicate with fluid outlet means which may be similar to those shown at 12 and 15 in FIGS. 1–3. Also, by controlling the flow of fluid through valve 84, any of the particle beds except fixed bed $B^8$ shown in FIGS. 6–8 can be expanded into a variable-height-fixed-bed state or into a fluidized bed state, as these terms have been previously defined hereinabove. Since a variable-height-fixed bed will not fluctuate in density and height with time, as a fluidized bed will, a variable-height-fixed bed is preferred for control of reactivity.

Further, while only one expandable control element has been shown in FIGS. 6–8 for the nuclear reactor, it will be understood that there may be several control elements for the reactor, depending on specific design considerations.

Other modifications and changes may occur to those skilled in the art without departing from the spirit of the present invention. Accordingly, the embodiments shown and described are illustrative and not limitative of the present invention the scope of which is to be measured by the appended claims.

What is claimed is:

1. In a nuclear reactor, the combination comprising a container having a perforated fluid inlet wall and a perforated fluid outlet wall at a higher elevation than said fluid inlet wall, a multiplicity of freely movable discrete solid particles arranged in said container, at least some of the perforations in said fluid outlet wall being below the level of said particles in said container at all times, and means for flowing fluid upwardly into said container through the perforations in said fluid inlet wall, at least part of the fluid escaping from said container through said perforations in said fluid outlet wall, thereby suspending said particles in fluid to form a bed having a variable volume dependent upon the rate of fluid flow.

2. In a nuclear reactor, the combination comprising a container having a perforated fluid inlet wall and a perforated fluid outlet wall, a multiplicity of freely movable discrete solid particles arranged in said container and at least some of which include fissionable material, at least some of the perforations in said fluid outlet wall being below the level of said particles in said container at all times, and means for controllably flowing fluid into said container through the perforations in said fluid inlet wall at such rate that said particles are suspended in a critical geometric disposition in the fluid enabling a self-sustaining nuclear chain reaction to occur which produces fission-generated heat absorbed by the fluid, at least part of the heated fluid escaping from said container through said perforations in said fluid outlet wall.

3. In a nuclear reactor, the combination comprising a container having a perforated side wall and a perforated bottom wall, a multiplicity of freely movable discrete solid particles arranged in said container, at least some of the perforations in said side wall being below the level of said particles in said container at all times, and means for flowing fluid upwardly through the perforations in said bottom wall which partly escapes from said container through said perforations in said side wall, thereby suspending said particles in fluid to form a bed having a variable height dependent upon the rate of fluid flow.

4. In a nuclear reactor, the combination comprising a container having a perforated side wall and a perforated bottom wall, a multiplicity of freely movable discrete solid particles arranged in said container, at least some of the perforations in said side wall being below the level of said particles in said container at all times, means for flowing fluid upwardly through the perforations in said bottom wall which partly escapes from said container through said perforations in said side wall, and means surrounding said side wall for confining fluid so escaping from said container, whereby said particles are suspended in fluid to form a bed having a variable height dependent upon the rate of fluid flow.

5. In a nuclear reactor, the combination comprising a container having a perforated side wall and a perforated bottom wall, an imperforate outer wall surrounding said side wall and providing a space therebetween, a multiplicity of freely movable discrete solid particles arranged in said container, at least some of the perforations in said side wall being below the level of said particles in said container at all times, means for flowing fluid upwardly through the perforations in said bottom wall which partly escapes through said perforations in said side wall from the interior of said container to said space, and means communicating with said interior and space for removing fluid.

6. In a nuclear reactor, the combination comprising a container having a perforated side wall and a perforated bottom wall, an outer imperforate wall surrounding said side wall and providing a space therebetween, a multiplicity of freely movable discrete solid particles arranged in said container, at least some of the perforations in said side wall being below the level of said particles in said container at all times, fluid inlet means arranged below said bottom wall communicating with the perforations therein, and fluid outlet means arranged above said bottom wall and communicating with said space and the interior of said container.

7. In a nuclear reactor, the combination comprising a core container having a perforated side wall and a perforated bottom wall, a bed of freely movable discrete solid particles arranged in said container and at least some of which include fissionable material, at least some of the perforations in said side wall being below the level of said bed, and means for controllably flowing fluid upwardly through the perforations in said bottom wall at such rate that said bed is expanded in height sufficiently to cause a self-sustaining nuclear chain reaction to occur which produces fission-generated heat absorbed by the fluid, part of the heated fluid flowing outwardly through said perforations in said side wall.

8. In a nuclear reactor, the combination comprising a core container having a perforated side wall and a perforated bottom wall, a bed of freely movable discrete solid particles arranged in said container and at least some of which include fissionable material, at least some of the perforations in said side wall being below the level of said bed, an imperforate outer wall surrounding said side wall and providing a space therebetween, means for controllably flowing fluid upwardly through the perforations in said bottom wall at such rate that said bed is expanded in height sufficiently to cause a self-sustaining nuclear chain reaction to occur which produces fission-generated heat absorbed by the fluid, part of the heated fluid flowing upwardly through the top of the expanded bed, the remainder of the heated fluid flowing outwardly through said perforations in said side wall from said expanded bed into said space, and means communicating with said space and top for removing heated fluid.

9. In a nuclear reactor, the combination comprising a core container having a perforated side wall and a perforated bottom wall, a bed of freely movable discrete solid particles arranged in said container and at least some of which include fissionable material, at least some of the perforations in said side wall being below the level of said bed, and means for controllably flowing fluid upwardly through the perforations in said bottom wall at such rate that said bed is expanded in height sufficiently to cause a self-sustaining nuclear chain reaction to occur which produces fission-generated heat absorbed by the fluid, part of the heated fluid flowing outwardly through said perforations in said side wall, said particles suspended in fluid in the expanded bed although being freely movable are substantially immobile.

10. In a nuclear reactor, the combination comprising a core container having a perforated side wall and a perforated bottom wall, a bed of freely movable discrete solid particles arranged in said container and at least some of which include fissionable material, at least some of the perforations in said side wall being below the level of said bed, and means for controllably flowing fluid upwardly through the perforations in said bottom wall at such rate that said bed is expanded in height over that when in a fixed state but below that when in a fluidized state but sufficient to cause a self-sustaining nuclear chain reaction to occur which produces fission-generated heat absorbed by the fluid, part of the heated fluid flowing outwardly through said perforations in said side wall.

11. In a nuclear reactor, the combination comprising a core container having a perforated side wall and a perforated bottom wall, a bed of freely movable discrete solid particles arranged in said container and at least some of which include fissionable material, at least some of the perforations in said side wall being below the level of said bed, and means for controllably flowing fluid upwardly through the perforations in said bottom wall at such rate that said bed is expanded in height sufficiently to cause a self-sustaining nuclear chain reaction to occur which produces fission-generated heat absorbed by the fluid, part of the heated fluid flowing outwardly through said perforations in said side walls, the expanded bed being in a fluidized state in which said particles suspended in fluid continuously circulate through the region of said expanded bed.

12. In a nuclear reactor, the combination comprising a core container having a perforated side wall and a perforated bottom wall, a bed of freely movable discrete solid particles arranged in said container and at least some of which include fissionable material, at least some of the perforations in said side wall being below the level of said bed, an imperforate outer wall surrounding said side wall and providing a space therebetween, means for controllably flowing fluid upwardly through the perforations in said bottom wall at such rate that said bed is expanded in height sufficiently to cause a self-sustaining nuclear chain reaction to occur which produces fission-generated heat absorbed by the fluid, part of the heated fluid flowing upwardly through the top of the expanded bed, the remainder of the heated fluid flowing outwardly through said perforations in said side wall from said expanded bed into said space, said particles suspended in fluid in said expanded bed although being freely movable are substantially immobile, and means communicating with said space and top for removing heated fluid.

13. In a nuclear reactor, the combination comprising a core container having a perforated side wall and a perforated bottom wall, a bed of freely movable discrete solid particles arranged in said container and at least some of which include fissionable material, at least some of the perforations in said side wall being below the level of said bed, an imperforate outer wall surrounding said side wall and providing a space therebetween, means for controllably flowing fluid upwardly through the perforations in said bottom wall at such rate that said bed is expanded in height over that when in a fixed state but below that when in a fluidized state but sufficient to cause the occurrence of a self-sustaining nuclear chain reaction which produces fission-generated heat absorbed by the fluid, part of the heated fluid flowing upwardly through the top of the expanded bed, the remainder of the heated fluid flowing outwardly through said perforations in said side wall from said expanded bed into said space, and means communicating with said space and top for removing heated fluid.

14. In a nuclear reactor, the combination comprising a core container having a perforated side wall and a perforated bottom wall, a bed of freely movable discrete solid particles arranged in said container and at least some of which include fissionable material, at least some of the perforations in said side wall being below the level of said bed, an imperforate outer wall surrounding said side wall and providing a space therebetween, means for controllably flowing fluid upwardly through the perforations in said bottom wall at such rate that said bed is expanded in height sufficiently to cause a self-sustaining nuclear chain reaction to occur which produces fission-generated heat absorbed by the fluid, part of the heated fluid flowing upwardly through the top of the expanded bed, the remainder of the heated fluid flowing outwardly through said perforations in said side wall from said expanded bed into said space, said expanded bed being in a fluidized state in which said particles suspended in fluid continuously circulate through the region of said expanded bed, and means communicating with said space and top for removing heated fluid.

15. In a nuclear rocket engine, the combination comprising a core container having a perforated inner side wall, an imperforate outer side wall surrounding said inner side wall and providing a space therebetween and a perforated end wall extending transversely of said space, a bed of freely movable discrete solid particles arranged in said container and at least some of which include fissionable material, at least some of the perforations in said inner side wall being below the level of said bed, means providing a chamber on the side of said end wall opposite from said space for supplying fluid to flow through the perforations in said end wall at a rate to expand said bed in volume sufficiently to cause a self-sustaining nuclear chain reaction to occur which produces fission-generated heat absorbed by the fluid propellant, a moderator body surrounding said core container, and nozzle means in fluid conducting communication with the side of said inner side wall opposite from said space for receiving heated fluid propellant discharged through said perforations in said inner side wall.

16. In a nuclear rocket engine, the combination comprising a core container having a perforated inner side wall, an imperforate outer side wall surrounding said inner side wall and providing a space therebetween and a perforated end wall extending transversely of said space, a bed of freely movable discrete solid particles arranged in said container and at least some of which include fissionable material, at least some of the perforations in said inner side wall being below the level of said bed, means providing a chamber on the side of said end wall opposite from said space for supplying fluid to flow through the perforations in said end wall at a rate to expand said bed in volume sufficiently to cause a self-sustaining nuclear chain reaction to occur which produces fission-generated heat absorbed by the fluid propellant, an inner moderator body surrounding said core container, an outer moderator body surrounding said inner moderator body, a heat insulator body interposed between said moderator bodies, and nozzle means in fluid conducting communication with the side of said inner side wall opposite from said space for receiving heated fluid propellant discharged through said perforations in said inner side wall.

17. In a nuclear rocket engine, the combination comprising a core container having a perforated inner side wall, an imperforate outer side wall surrounding said inner side wall and providing a space therebetween and a perforated end wall extending transversely of said space, a bed of freely movable discrete solid particles arranged in said container and at least some of which include fissionable material, at least some of the perforations in said inner side wall being below the level of said bed, means providing a chamber on the side of said end wall opposite from said space for supplying fluid to flow through the perforations in said end wall at a rate to expand said bed in volume sufficiently to cause a self-sustaining nuclear chain reaction to occur which produces fission-generated heat absorbed by the fluid propellant, an inner moderator body surrounding said core container, an outer moderator body surrounding said inner moderator body, a heat insulator body interposed between said moderator bodies, conduit means arranged in said moderator bodies and communicating with said chamber for conducting fluid propellant prior to entering said chamber, and nozzle means in fluid conducting communication with the side of said inner side wall opposite from said space for receiving heated fluid propellant discharged through said perforations in said inner side wall.

18. In a nuclear reactor having a core provided with an opening, the combination therewith of reactivity control means comprising a container having a perforated side wall arranged in said opening and a perforated bottom wall, a bed of freely movable discrete solid reactivity control particles arranged in said container, at least some of the perforations in said side wall being below the level of said bed, and means for controllably flowing fluid upwardly through the perforations in said bottom wall to expand said bed to a height which depends upon the rate of fluid flow.

19. In a nuclear reactor including a core provided with a generally vertical opening, the combination therewith of reactivity control means comprising a container having a perforated side wall arranged in said opening and a perforated bottom wall, a bed of freely movable discrete solid fissile particles arranged in said container, at least some of the perforations in said side wall being below the level of said bed, and means for controllably flowing fluid upwardly through the perforations in said bottom wall to expand said bed to a height which depends upon the rate of fluid flow, said bed when unexpanded having a height which is a fraction of the height of said opening.

20. In a nuclear reactor including a core provided with a generally vertical opening having lower and upper ends, the combination therewith of reactivity control means comprising a container having a perforated side wall arranged in said opening and a perforated bottom wall arranged no higher than said lower end, a bed of freely movable discrete solid fissile particles arranged in said container, at least some of the perforations in said side wall being below the level of said bed, and means for controllably flowing fluid upwardly through the perforations in said bottom wall to expand said bed to a height which depends upon the rate of fluid flow, said bed when unexpanded having a height which is a fraction of the height of said opening but having a top arranged above said lower end, said bed being capable of being expanded to increase reactivity until the bed top is substantially level with said upper end after which further bed top rise serves to decrease reactivity.

21. In a nuclear reactor including a core provided with a generally vertical opening, the combination therewith of reactivity control means comprising a container having a perforated side wall arranged in said opening and a perforated bottom wall, a bed of freely movable discrete neutron-absorbing solid particles arranged in said container, at least some of the perforations in said side wall being below the level of said bed, and means for controllably flowing fluid upwardly through the perforations in said bottom wall to expand said bed to a height which depends upon the rate of fluid flow, said bed extending for the full height of said opening at all times, expansion of said bed increasing reactivity.

22. In a nuclear reactor including a core provided with a generally vertical opening, the combination therewith of reactivity control means comprising an inner container having a perforated inner side wall arranged in said opening, an outer container having an outer side wall surrounding and spaced from said inner side wall and also having a perforated bottom wall, an inner bed of solid fissile particles arranged in said inner container, an outer bed of freely movable discrete neutron-absorbing solid particles arranged in said second container, and means for controllably flowing fluid upwardly through the perforations in said bottom wall to expand said outer bed to a height which depends upon the rate of fluid flow, the perforations in said inner side wall permitting the entrance of fluid into said inner bed, said beds severally extending for the full height of said opening at all times, expansion of said outer bed increasing reactivity.

23. In a nuclear reactor having a core provided with an opening, the combination therewith of reactivity control means comprising a container having a perforated side wall arranged in said opening and a perforated bottom wall, a bed of freely movable discrete solid particles arranged in said container, at least some of the perforations in said side wall being below the level of said bed, an imperforate outer wall surrounding said side wall and providing a space therebetween, means for controllably flowing fluid upwardly through the perforations in said bottom wall which partly escapes through said perforations in said side wall from the interior of said container to said space, whereby the height of said bed depends upon the rate of fluid flow, and fluid outlet means communicating with said interior and space.

24. In a nuclear reactor having a core provided with a generally vertical opening, the combination therewith of reactivity control means comprising a container having a perforated side wall arranged in said opening and a perforated bottom wall, a bed of freely movable discrete solid fissile particles arranged in said container, at least some of the perforations in said side wall being below the level of said bed, an imperforate outer wall surrounding said side wall and providing a space therebetween, means for controllably flowing fluid upwardly through the perforations in said bottom wall which partly escapes through said perforations in said side wall from the interior of said container to said space, whereby the height of said bed depends upon the rate of fluid flow, said bed when unexpanded having a height which is a fraction of the height of said opening, and fluid outlet means communicating with said interior and space.

25. In a nuclear reactor including a core provided with a generally vertical opening having lower and upper ends, the combination therewith of reactivity control means comprising a container having a perforated side wall arranged in said opening and a perforated bottom wall arranged no higher than said lower end, a bed of freely movable discrete solid fissile particles arranged in said container, at least some of the perforations in said side wall being below the level of said bed, an imperforate outer wall surrounding said side wall and providing a space therebetween, means for controllably flowing fluid upwardly through the perforations in said bottom wall which partly escapes through said perforations in said side wall from the interior of said container to said space, whereby the height of said bed depends upon the rate of fluid flow, said bed when unexpanded having a height which is a fraction of the height of said opening but having a top arranged above said lower end, said bed being capable of being expanded to increase reactivity until the bed top is substantially level with said upper end after which further bed top rise serves to decrease reactivity, and fluid outlet means communicating with said interior and space.

26. In a nuclear reactor having a core provided with a generally vertical opening, the combination therewith of reactivity control means comprising a container having a perforated side wall arranged in said opening and a perforated bottom wall, a bed of freely movable discrete neutron-absorbing solid particles arranged in said container, at least some of the perforations on said side wall being below the level of said bed, an imperforate outer wall surrounding said side wall and providing a space therebetween, means for controllably flowing fluid upwardly through the perforations in said bottom wall which partly escapes through said perforations in said side wall from the interior of said container to said space, whereby the height of said bed depends upon the rate of fluid flow, said bed even when unexpanded extending for the full height of said opening, expansion of said bed increasing reactivity, and fluid outlet means communicating with said interior and space.

27. In a nuclear reactor including a core provided with a generally vertical opening, the combination therewith of reactivity control means comprising an inner container having a perforated inner side wall arranged in said opening, an outer container having a perforated outer side wall surrounding and spaced from said inner side wall and also having a perforated bottom wall, an inner bed of solid fissile particles arranged in said inner container, an outer bed of freely movable discrete neutron-absorbing solid particles arranged in said second container, at least some of the perforations in each of said side walls being below the level of each of said beds, an imperforate outer wall surrounding said outer side wall and providing a space therebetween, means for controllably flowing fluid upwardly through the perforations in said bottom wall which partly escapes through the perforations in said outer side wall from the interior of said second container to said space, the perforations in said inner side wall permitting the entrance of fluid into said inner bed, whereby the height of said outer bed depends upon the rate of fluid flow, said beds severally extending for the full height of said opening at all times, expansion of said outer bed increasing reactivity, and fluid outlet means communicating with said space and the interiors of said containers.

References Cited by the Examiner

UNITED STATES PATENTS

| | | | |
|---|---|---|---|
| 2,782,158 | 2/1957 | Wheeler | 176—59 |
| 2,894,891 | 7/1959 | Grebe | 176—42 |
| 3,031,397 | 4/1962 | Fortescue et al. | 176—22 |
| 3,046,212 | 7/1962 | Anderson | 176—45 |
| 3,058,897 | 10/1962 | Slack et al. | 176—45 |
| 3,105,033 | 9/1963 | Camac | 176—22 |
| 3,108,054 | 10/1963 | Blackman | 60—35.5 |
| 3,150,054 | 9/1964 | Fox | 60—35.5 X |
| 3,168,807 | 2/1965 | Ledwith et al. | 60—35.5 |

FOREIGN PATENTS

| | | |
|---|---|---|
| 1,197,551 | 12/1959 | France. |
| 1,310,151 | 10/1962 | France. |

REUBEN EPSTEIN, *Primary Examiner.*